J. A. SCHMITZ.
TIRE CARRIER.
APPLICATION FILED MAR. 7, 1916.

1,224,327.

Patented May 1, 1917.
2 SHEETS—SHEET 1.

Witnesses
L. B. James
S. Friedman

Inventor
J. A. Schmitz
By Perry H. Pattison, Attorney

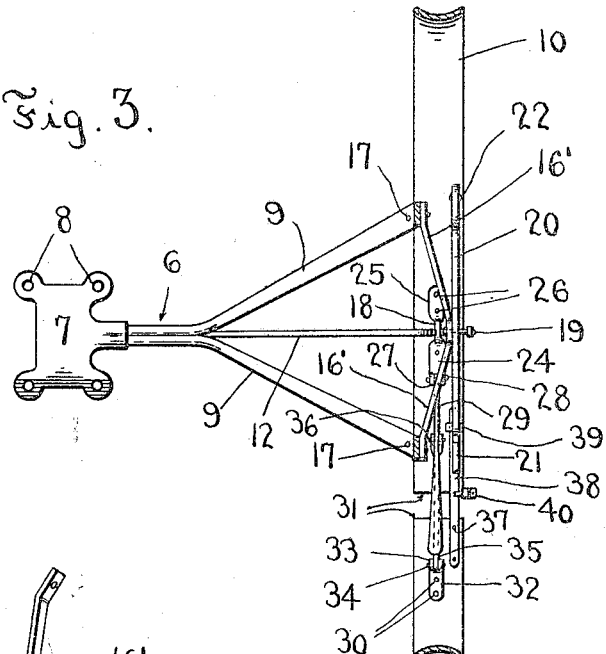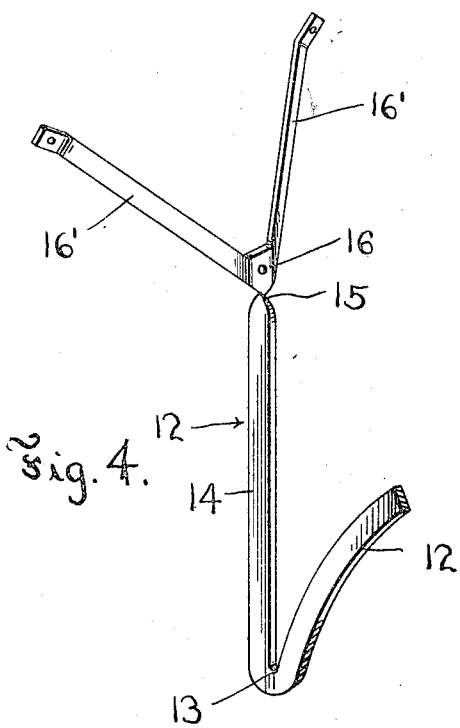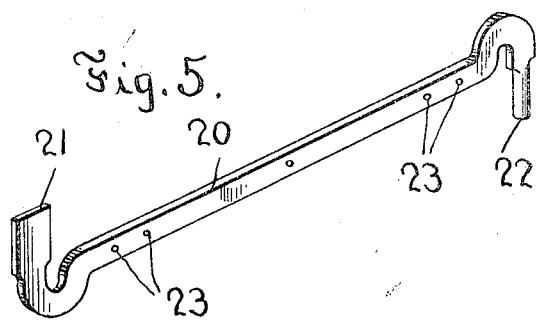

UNITED STATES PATENT OFFICE.

JOHN A. SCHMITZ, OF MERRICOURT, NORTH DAKOTA.

TIRE-CARRIER.

1,224,327.  Specification of Letters Patent.  Patented May 1, 1917.

Application filed March 7, 1916. Serial No. 82,534.

*To all whom it may concern:*

Be it known that I, JOHN A. SCHMITZ, a citizen of the United States, residing at Merricourt, in the county of Dickey and State of North Dakota, have invented certain new and useful Improvements in Tire-Carriers, of which the following is a specification.

This invention relates to tire carriers.

The primary object of this invention resides in the provision of a tire carrier for automobiles whereby the tire engaging element can be readily contracted or expanded to either engage or disengage the inner periphery of the tire.

Another object of this invention resides in the combination of certain elements whereby the structure will readily form lamp and license tags supports without affecting the yieldability of the tire engaging element.

A further object of this invention resides in the combination of certain elements whereby a tire can be either placed on the tire engaging element or removed from the same without the use of tools.

A still further object of this invention resides in the provision of certain elements whereby the relative positions of the lamp and license tags will remain in a rigid position regardless of the manipulation of the tire releasing and engaging means.

In the accompanying drawings;

Fig. 3 is a horizontal sectional view of the tire carrier taken on line 3—3 of Fig. 2;

Fig. 4 is a detail perspective view of the forked bracket; and

Fig. 5 is a detail perspective view of the lamp and tag supporting bracket.

Figure 1:
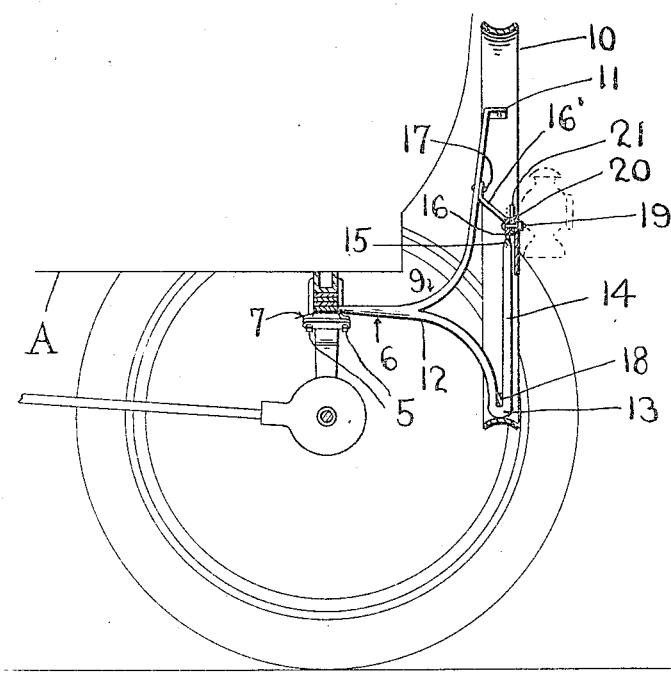
Figure 1 is a vertical sectional view of a portion of an automobile with the tire carrier supported from the rear spring support.
Figure 2:
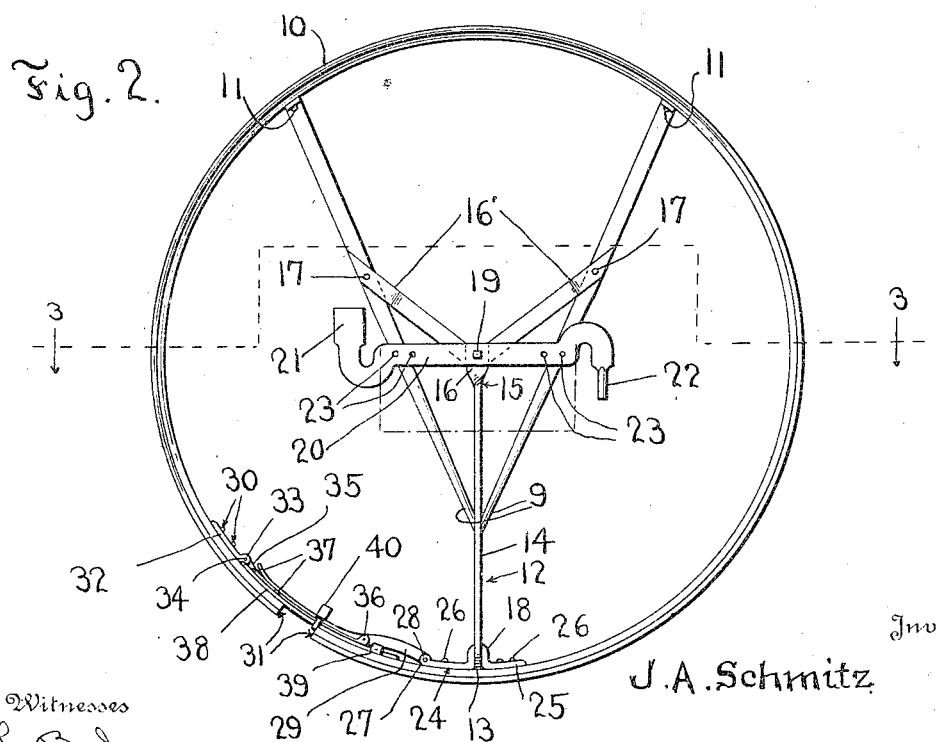
Fig. 2 is a rear view of the tire carrier removed from the automobile.

Referring more particularly to the present embodiment of this invention the letter A represents an automobile which is in this instance a conventional illustration of the Ford design.

Secured by the usual rear spring fastening elements 5 is a main bracket 6 in this instance consisting of an arcual plate 7 apertured as at 8 for co-action with said fastening elements 5 in retaining the rigidity of said bracket, but should occasion arise whereby it becomes necessary to secure the tire carrier on another part of the automobile it is to be understood that such changes as come within the scope of this invention may be resorted to.

Welded to the arcual plate 7 are outwardly and upwardly extending rods 9 which bear a parallel relation to one another adjacent their inner ends and diverge to certain points on the inner periphery of the tire securing band 10, where they are securely fastened as at 11, thus forming ample supporting elements for said band.

Suitably secured to the aforesaid arcual plate 7 is a supplemental bracket 12 which extends outwardly and downwardly to a point on the inner periphery of said tire securing band 10 at which point it is bent as at 13 and continued upwardly and thus forming an arm 14. This arm 14 is twisted as at 15 so that the flat side thereof will be at right angles to that of the arm 14 proper.

Extending from the twisted terminal 16 of the arm 14 are diverging forks $16^1$ which are directed toward the diverging rods 9 and securely fastened thereto as at 17, while at the point on the tire securing band where the supplement bracket contacts, a yoke 18 firmly engages the loop of said bracket and is suitably secured to said tire band.

Rigidly secured as at 19 to the right angularly bent portion of the arm 14 is a lamp bracket 20 having its outer ends 21—22 bent in opposite directions, the latter of which being round for the accommodation of a lamp having a round socket while the former is flattened for lamps having an angular socket. In order that the lamp will bear a certain relative position to the number tag of the automobile, the lamp bracket is provided with a plurality of apertures 23 for the reception of fastening elements of the tag.

Extending in opposite directions from the aforesaid yoke 18 are arms 24 and 25 which are rigidly secured to said tire engaging band 10 by rivets or the like 26.

Formed on the arm 24 of said yoke are apertured ears 27 for the reception of a pintle 28 which passes through the inner end of a hand lever 29 and thereby forms a pivotal connection between the ears and said lever.

Secured as at 30 to the opposite side of the lateral split 31 which is formed by cutting the band 10, is a bracket 32 having ears 33 adapted to receive a pintle 34.

Pivotally secured to the ears 33 of said bracket 32 is a link 35 which extends toward the yoke 18 and is pivoted as at 36 to the band lever 29.

In order that the hand lever will have the desired leverage to readily expand and contract the tire band 10, said link 35 is pivotally secured to said hand lever adjacent its pintle 28.

Riveted as at 37, to one side of the aforesaid split is a guide arm 38 which is in slidable engagement with a slotted boss 39 secured on the opposite side of the split in the tire engaging band.

This guide arm by being continuously in engagement with the slotted boss, prevents any twisting action between the opposite ends of the split tire engaging band 10 and further forms a locking element for the reception of a lock as indicated at 40.

In the assemblage of the aforesaid expanding and contracting means for engaging and disengaging the tire, the positions of the pivotal points between the hand lever and the link are arranged so that after the said hand lever has been expanded, the tire band will remain closed independently of a permanent locking device.

I claim:

A tire carrier comprising a tire securing band split laterally, a main bracket having its outer terminals secured at remote points on the inner periphery of said tire securing band, a supplemental bracket contacting with said tire securing band, a yoke rigidly securing the intermediate portion of said supplemental bracket to said tire securing band, a lamp bracket centrally secured to said supplemental bracket and terminating in oppositely disposed lamp engaging members, and means rigidly binding the terminals of said supplemental bracket to said main bracket.

In testimony whereof I affix my signature in the presence of two witnesses.

JOHN A. SCHMITZ.

Witnesses:
  E. G. SWEENEY,
  LEE NORTHROP.